US010253887B1

(12) United States Patent
Kloss et al.

(10) Patent No.: US 10,253,887 B1
(45) Date of Patent: Apr. 9, 2019

(54) STEM ASSEMBLY FOR A VALVE

(71) Applicant: CIRCOR INTERNATIONAL, INC., Burlington, MA (US)

(72) Inventors: James Kloss, Tampa, FL (US); Doug Hunter, Valreco, FL (US); Ryan Sheldon, Lutz, FL (US)

(73) Assignee: CIRCOR INTERNATIONAL, INC., Burlington, MA (US)

( * ) Notice: Subject to any disclaimer, the term of this patent is extended or adjusted under 35 U.S.C. 154(b) by 0 days.

(21) Appl. No.: 15/863,323

(22) Filed: Jan. 5, 2018

(51) Int. Cl.
| *F16K 1/12*  | (2006.01) |
| *F16K 1/36*  | (2006.01) |
| *F16K 31/04* | (2006.01) |
| *F16K 31/06* | (2006.01) |

(52) U.S. Cl.
CPC .................. *F16K 1/12* (2013.01); *F16K 1/36* (2013.01); *F16K 31/048* (2013.01); *F16K 31/0655* (2013.01)

(58) Field of Classification Search
CPC . F16K 1/12; F16K 1/36; F16K 31/408; F16K 31/0655
USPC ..................................... 251/30.03–30.04, 122
See application file for complete search history.

(56) References Cited

U.S. PATENT DOCUMENTS

| 2,379,181 | A | * | 6/1945 | Pontius | ................. | F16K 31/408 |
| | | | | | | 251/30.04 |
| 2,575,272 | A | * | 11/1951 | Harris | ................... | F16K 31/408 |
| | | | | | | 137/629 |
| 3,405,906 | A | * | 10/1968 | Keller | ................... | F16K 31/408 |
| | | | | | | 251/30.04 |
| 3,941,348 | A | * | 3/1976 | Mott | ....................... | E21B 21/08 |
| | | | | | | 251/58 |
| 4,304,264 | A | * | 12/1981 | McClintock | ......... | F16K 31/408 |
| | | | | | | 137/630.13 |
| 4,699,351 | A | * | 10/1987 | Wells | ..................... | F16K 31/408 |
| | | | | | | 251/29 |
| 4,746,093 | A | * | 5/1988 | Scanderbeg | .......... | F16K 31/408 |
| | | | | | | 251/30.04 |
| 5,048,790 | A | * | 9/1991 | Wells | ..................... | F16K 31/408 |
| | | | | | | 251/30.04 |
| 5,188,017 | A | * | 2/1993 | Grant | ...................... | F17C 13/04 |
| | | | | | | 251/30.04 |
| 7,730,905 | B2 | * | 6/2010 | Suzuki | .................... | F17C 13/04 |
| | | | | | | 137/613 |
| 8,382,063 | B2 | * | 2/2013 | Watanabe | ........... | F16K 31/0655 |
| | | | | | | 137/315.03 |
| 2007/0090317 | A1 | * | 4/2007 | Kamiya | .................. | F16K 1/305 |
| | | | | | | 251/129.15 |

(Continued)

*Primary Examiner* — John Bastianelli
(74) *Attorney, Agent, or Firm* — McNees Wallace & Nurick LLC

(57) ABSTRACT

A stem assembly for a valve including a shaft having a longitudinal axis and a first end having a cross section less than a cross section of the shaft, and a protrusion near the first end extending away from the axis. In response to the first end and the protrusion being positionable inside a compartment of a valve plug having an opening in fluid communication with a fluid of a valve during operation of the valve, the first end and the protrusion being movable between a first position and a second position relative to the valve plug. In the first position, the first end blocking the opening for preventing fluid flow therethrough, and in the second position, the first end being movable away from the compartment opening for permitting fluid flow through the opening.

20 Claims, 3 Drawing Sheets

(56) References Cited

U.S. PATENT DOCUMENTS

2014/0174576 A1\* 6/2014 Alikhani ............... F16K 39/024
　　　　　　　　　　　　　　　　　　　　137/630.13

\* cited by examiner

STEM ASSEMBLY FOR A VALVE

FIELD OF THE INVENTION

The present invention is directed to a control valve, and specifically to a control valve having a valve stem assembly.

BACKGROUND OF THE INVENTION

Valves are widely used in fluid systems to provide controlled fluid flow behavior in the systems. Some valves utilized in high pressure drop applications or having large seat diameters may require pressure-balanced trim, typically including an actuator operatively connected to a valve stem assembly having a pilot head that extends into a small pilot area inside the valve plug between an open position and a closed position. The actuator urges the pilot head of the valve stem assembly away from the closed position, relieving the pressure in the cavity above the valve plug, and permitting the actuator to lift the entire valve plug using reduced force. When the pilot area is closed, the valve plug is sealed, preventing fluid flow therethrough.

With current valve stem assemblies, the pilot head is both threadedly engaged and welded to the valve stem, which welding may require subsequent heat treatment and re-coating, resulting in added fabrication and assembly time and cost. Additionally, the enlarged pilot head is acted on by fluid pressure that must be overcome by the actuator. Finally, the pilot head is prone to failure in field service.

What is needed is a valve stem assembly that does not suffer from these drawbacks.

SUMMARY OF THE INVENTION

The present invention relates to a stem assembly for a valve including a shaft having a longitudinal axis and a first end having a cross section less than a cross section of the shaft, and a protrusion near the first end extending away from the axis. In response to the first end and the protrusion being positionable inside a compartment of a valve plug having an opening in fluid communication with a fluid of a valve during operation of the valve, the first end and the protrusion being movable between a first position and a second position relative to the valve plug. In the first position, the first end blocking the opening for preventing fluid flow therethrough, and in the second position, the first end being movable away from the opening for permitting fluid flow through the opening.

The present invention further relates to a plug assembly for a valve including a stem assembly including a shaft having a longitudinal axis and a first end having a cross section less than a cross section of the shaft. The plug assembly further includes a protrusion near the first end extending away from the axis, and a valve plug having a compartment having an opening formed therein. In response to the first end and the protrusion being positionable inside the compartment, and the valve plug being positionable inside of a valve, the opening in fluid communication with a fluid of a valve during operation of the valve, the first end and the protrusion of the stem assembly being movable between a first position and a second position relative to the valve plug. In the first position, the first end blocking the opening for preventing fluid flow therethrough, and in the second position, the first end being movable away from the opening, permitting fluid flow through the opening.

The present invention yet further relates to a valve including a stem assembly including a shaft having a longitudinal axis and a first end having a cross section less than a cross section of the shaft, and a protrusion near the first end extending away from the axis. The valve further includes a valve plug having a compartment having an opening formed therein and a valve body. In response to the first end and the protrusion being positionable inside the compartment, and the valve plug being positionable inside of the valve body, the opening in fluid communication with a fluid of a valve during operation of the valve, the first end and the protrusion of the stem assembly being movable between a first position and a second position relative to the valve plug. In the first position, the first end blocking the opening for preventing fluid flow therethrough, and in the second position, the first end being movable away from the opening, permitting fluid flow through the opening.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
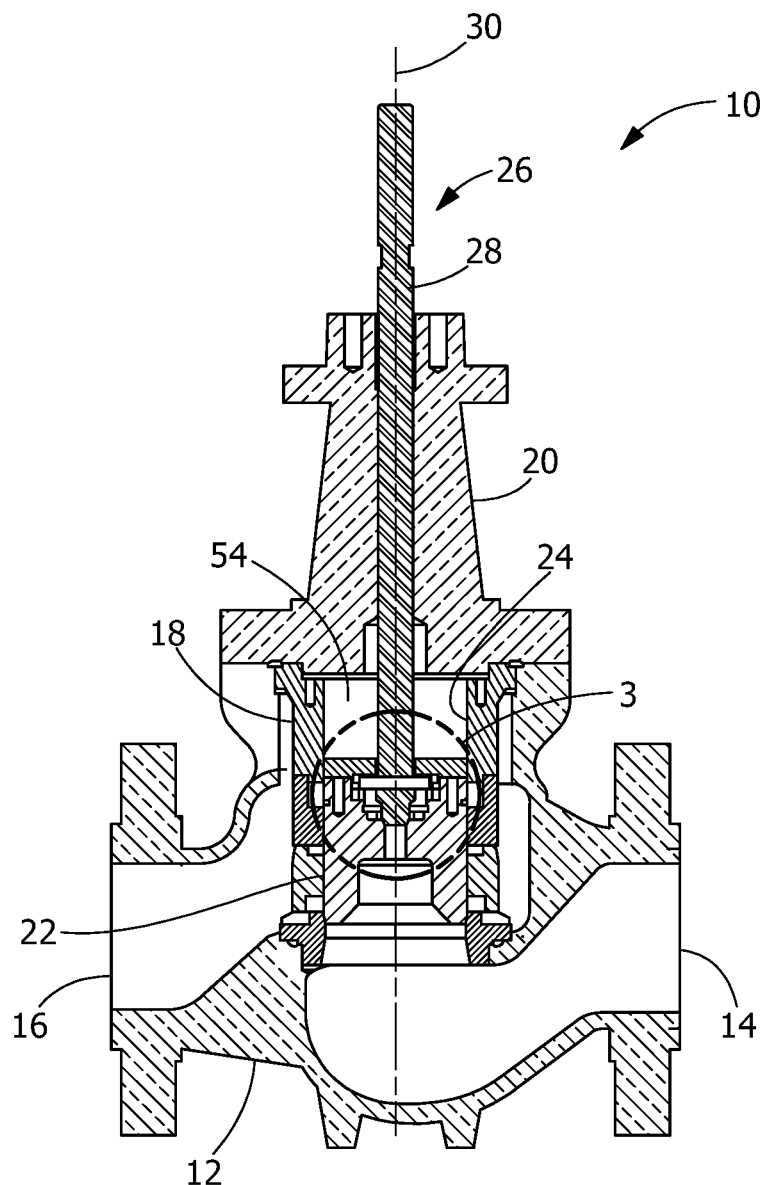
FIG. 1 is a cross section of a valve according to the present invention.
Figure 3:
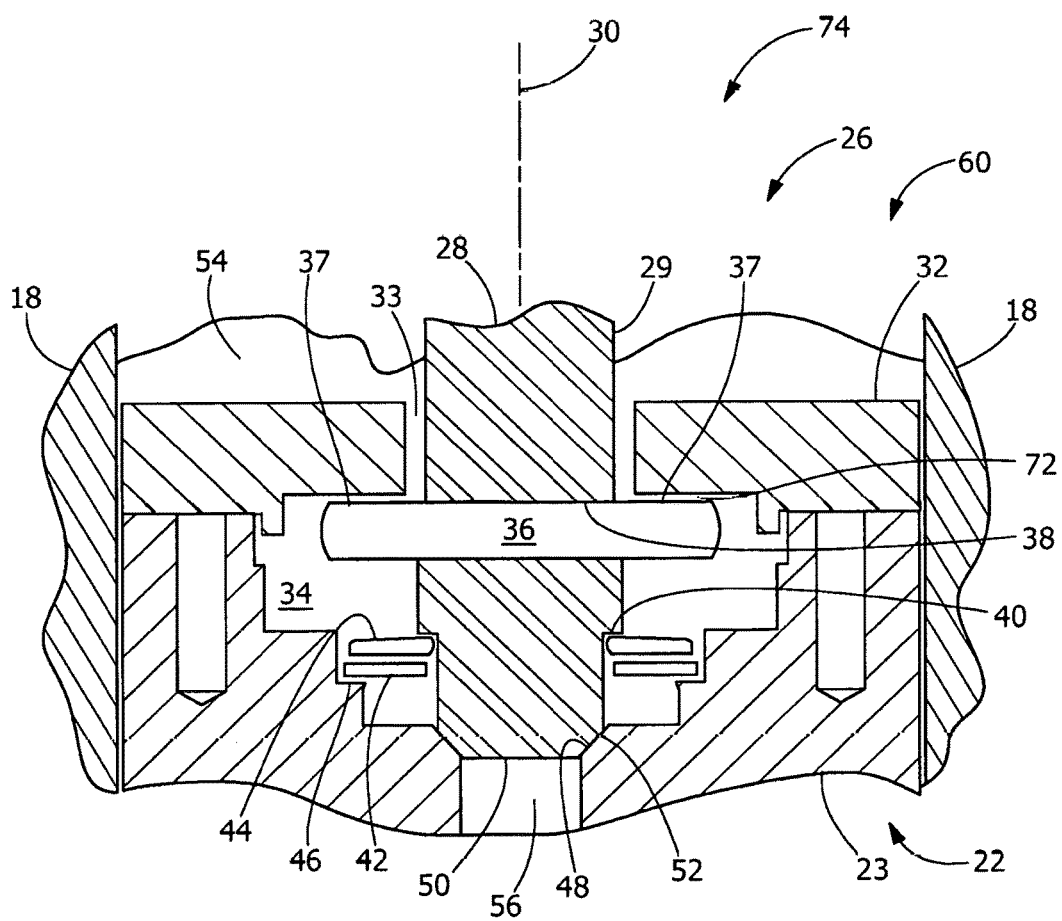
FIG. 3 is an enlarged view of an exemplary stem assembly in a closed position taken from region 3 of FIG. 1.
Figure 4:
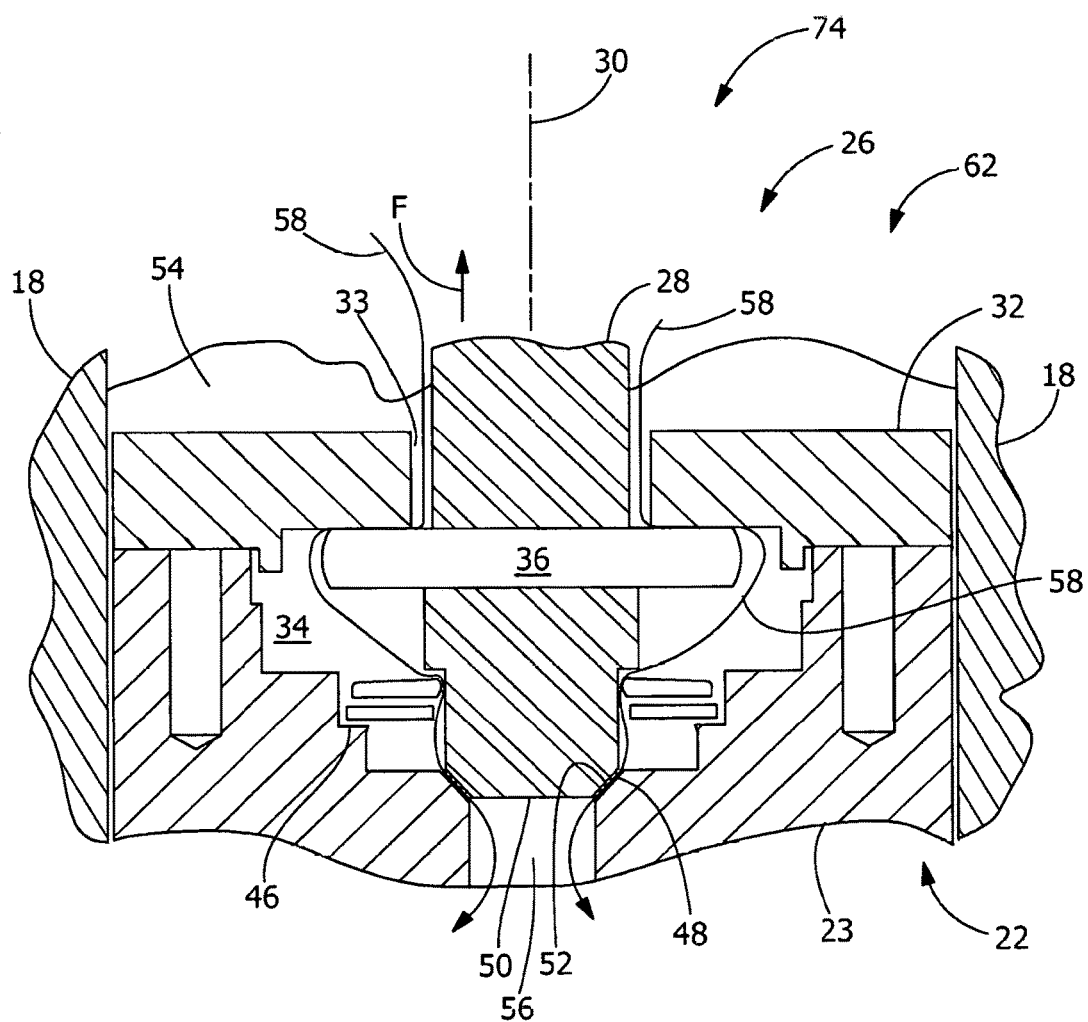
FIG. 4 is an enlarged view of an exemplary stem assembly in an open position taken from region 3 of FIG. 1.

FIGS. 1, 3 and 4 show a valve 10 having a body 12 that includes an inlet 14 and an outlet 16. A valve closure unit or plug 22 is slidably movable along an inner surface 24 of a cage 18 that is secured within body 12 and bonnet 20 for regulating fluid flow between inlet 14 and outlet 16. As shown in FIG. 3, which is an enlarged view taken from region 3 of FIG. 1, plug 22 includes a body 23 and cap 32. A pilot area or compartment 34 is formed inside of plug 22 between the junction of body 23 and cap 32. A stem assembly 26 includes a shaft 28 having an axis or longitudinal axis 30 that extends to an end 50. A plug assembly 74 includes the stem assembly in combination with the plug. In one embodiment, the cross section of the end is less than or equal to the cross section of the shaft (e.g., as measured perpendicular to the longitudinal axis). In one embodiment, the cross section of at least one of the shaft and shaft end is circular. As shown, end 50 and pin 36, which extends through an opening 38 formed through shaft 28 near end 50, are positioned inside of compartment 34. That is, shaft 28 extends through an opening 33 formed in cap 32, with end 50 and pin 36 positioned interior of compartment 34. Pin 36 forms a pair of protrusions 37 extending outwardly from an outer surface 29 of shaft 28. In one embodiment, protrusions 37 and shaft 28 are formed of unitary or one piece construction. In one embodiment, protrusions 37, shaft 28 and end 50 are formed of unitary or one piece construction. In one embodiment, there is/are a different number of protrusions 37 extending outwardly from outer surface 29 than two.

As further shown in FIG. 3, shaft 28 includes an inwardly extending circumferential shoulder 40 positioned between opening 38 and end 50. Surface features of compartment 34 formed in body 23 of plug 22 include a circumferential shoulder 46 formed near opening 56 of body 23 of plug 22. As shown, washers 42, 44 are captured between respective shoulders 40, 46 upon assembly. In one embodiment, at least one of washers 42, 44, such as washer 44 is a Belleville washer, which is arranged such that upon a seating surface 52 associated with end 50 of shaft 28 and corresponding seat 48 of body 23 of plug 22 forming a fluid tight seal therebetween, washer 44 is subjected to a predetermined preload. Other suitable arrangements providing the preload may be used. That is, upon seating surface 52 and seat 48 forming a fluid tight seal therebetween, end 50 of stem assembly 26 is in a closed position 60 preventing fluid flow through opening 56 of body 23 of plug 22, with protrusion(s) 37 separated from cap 32 by a spacing 72.

Conversely, as shown in FIG. 4, upon actuation source (not shown) applying a sufficient application force F to shaft 28 of stem assembly 26 in a direction parallel to axis 30, seating surface 52 of end 50 of stem assembly 26 is urged to move away from seat 48, permitting fluid flow 58 from cavity 54 into compartment 34 and through opening 56 of plug 22. That is, pressurized fluid contained in cavity 54 (FIG. 1), which is defined by bonnet 20, cap 32 of plug 22, inner surface 24 of cage 18, and outer surface 29 of shaft 28 is vented to flow through opening 33 of cap 32, into compartment 34, and then flow through opening 56 of body 23 of plug 22 in response to end 50 being in an open position 62. In response to end 50 being in the open position and the resultant venting of pressurized fluid from cavity 54, the force required to move the valve plug, occurring as a result of the protrusions of pin 36 abutting a corresponding portion of compartment 34 associated with cap 32, is reduced.

Figure 2:
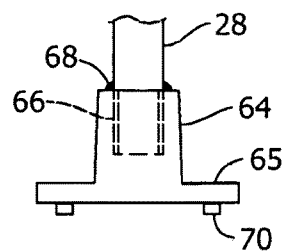
FIG. 2 is a partial view of a prior art stem assembly.

The novel stem assembly of the present invention provides several benefits over conventional stem assemblies. A first benefit is, as a result of the cross section of the end of the shaft being less than the cross section of the shaft, as previously discussed, there is virtually no surface for the fluid pressure in the compartment to act upon, except to assist in opening the pilot by pushing on the (e.g., circumferential) shoulder of the shaft, permitting the pilot-balanced trim arrangement applied by an actuator (not shown) to open a control valve with essentially the same forces as a balanced trim arrangement, while providing the sealing capability of an unbalanced trim arrangement. In contrast, as shown in FIG. 2, a conventional pilot head 64 has a radially outwardly extending flange 65 which either has a cross section greater than the cross section of the shaft 28, which flange providing a surface for fluid pressure in the compartment to act upon, or the same cross section (e.g., diameter) as the shaft, thereby requiring an increased actuator force to open the pilot compartment, compared to the arrangement of the present invention. A second benefit is the stem assembly of the present invention requires fewer parts and simplified assembly (i.e., press fitting a pin into the shaft opening or the shaft and protrusions being of unitary or one piece construction) compared with the conventional pilot head 64 (FIG. 2) (multiple springs 70 assembled to pilot head 64; pilot head 64 requiring both threaded engagement via threaded opening 66 and then a weld 68 securing the pilot head and the shaft together (requiring re-coating and subsequent heat treatment) that is prone to breakage in service.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A stem assembly for a valve comprising:
    a shaft having a cross section and a longitudinal axis and extending to a first end, the shaft having an inwardly extending circumferential shoulder formed near the first end, a segment of the shaft between the shoulder and the first end having a reduced cross section relative to a cross section of a remaining portion of the shaft;
    at least one washer positioned surrounding the segment;
    a protrusion near the first end extending away from the axis;
    wherein in response to the first end and the protrusion being positionable inside a compartment of a valve plug having an opening in fluid communication with a fluid of a valve during operation of the valve, the first end and the protrusion being movable between a first position and a second position relative to the valve plug;
    wherein in the first position, the first end blocking the opening for preventing fluid flow therethrough, the at least one washer being spring biased and subjected to a preload between the shoulder and a surface of the valve plug near the opening;
    wherein in the second position, the first end being movable away from the opening for permitting fluid flow through the opening.

2. The stem assembly of claim 1, wherein the shaft and the first end are of one piece construction.

3. The stem assembly of claim 1, wherein the shaft, the first end, and the protrusion are of one piece construction.

4. The stem assembly of claim 1, wherein in the second position, the first end being movable parallel to the axis away from the opening, permitting fluid flow through the opening.

5. The stem assembly of claim 1, wherein in the second position, in response to application of a sufficient force parallel to the axis away from the opening, the protrusion abutting a portion of the compartment for urging the valve plug into movement thereby.

6. The stem assembly of claim 1, wherein the protrusion is a pin at least partially inserted in a second opening formed in the shaft.

7. The stem assembly of claim 1, wherein the at least one washer is a Belleville washer.

8. A plug assembly for a valve comprising:
    a stem assembly comprising:
        a shaft having a cross section and a longitudinal axis and extending to a first end, the shaft having an inwardly extending circumferential shoulder formed near the first end, a segment of the shaft between the shoulder and the first end having a reduced cross section relative to a cross section of a remaining portion of the shaft;
        at least one washer positioned surrounding the segment; and
        a protrusion near the first end extending away from the axis; and
    a valve plug having a compartment having an opening formed therein;

wherein in response to the first end and the protrusion being positionable inside the compartment, and the valve plug being positionable inside of a valve, the opening in fluid communication with a fluid of a valve during operation of the valve, the first end and the protrusion of the stem assembly being movable between a first position and a second position relative to the valve plug;

wherein in the first position, the first end blocking the opening for preventing fluid flow therethrough, the at least one washer being spring biased and subjected to a preload between the shoulder and a surface of the valve plug near the opening;

wherein in the second position, the first end being movable away from the opening, permitting fluid flow through the opening.

9. The plug assembly of claim 8, wherein the shaft and the first end are of one piece construction.

10. The plug assembly of claim 8, wherein the shaft, the first end, and the protrusion are of one piece construction.

11. The plug assembly of claim 8, wherein in the second position, the first end being movable parallel to the axis away from the opening, permitting fluid flow through the opening.

12. The plug assembly of claim 8, wherein in the second position, in response to application of a sufficient force parallel to the axis away from the opening, the protrusion abutting a portion of the compartment for urging the valve plug into movement thereby.

13. The plug assembly of claim 8, wherein the protrusion is a pin at least partially inserted in a second opening formed in the shaft.

14. The plug assembly of claim 8, wherein the at least one washer is a Belleville washer.

15. A valve comprising:
   a stem assembly comprising:
      a shaft having a cross section and a longitudinal axis and extending to a first end, the shaft having an inwardly extending circumferential shoulder formed near the first end, a segment of the shaft between the shoulder and the first end having a reduced cross section relative to a cross section of a remaining portion of the shaft;
      at least one washer positioned surrounding the segment; and
      a protrusion near the first end extending away from the axis; and
   a valve plug having a compartment having an opening formed therein; and
   a valve body;
   wherein in response to the first end and the protrusion being positionable inside the compartment, and the valve plug being positionable inside of the valve body, the opening in fluid communication with a fluid of a valve during operation of the valve, the first end and the protrusion of the stem assembly being movable between a first position and a second position relative to the valve plug;
   wherein in the first position, the first end blocking the opening for preventing fluid flow therethrough, the at least one washer being spring biased and subjected to a preload between the shoulder and a surface of the valve plug near the opening;
   wherein in the second position, the first end being movable away from the opening, permitting fluid flow through the opening.

16. The valve of claim 15, wherein the shaft and the first end are of one piece construction.

17. The valve of claim 15, wherein the shaft, the first end, and the protrusion are of one piece construction.

18. The valve of claim 15, wherein in the second position, the first end being movable parallel to the axis away from the opening, permitting fluid flow through the opening.

19. The valve of claim 15, wherein in the second position, in response to application of a sufficient force parallel to the axis away from the opening, the protrusion abutting a portion of the compartment for urging the valve plug into movement thereby.

20. The valve of claim 15, wherein the protrusion is a pin at least partially inserted in a second opening formed in the shaft.

* * * * *